United States Patent [19]

Reynolds et al.

[11] 3,760,897

[45] Sept. 25, 1973

[54] LOAD MOVING VEHICLE

[76] Inventors: James R. Reynolds, 681 B Ehrhorn, Mountain View, Calif.; Richard Manske, 4013 W. Tuolumne Rd., Turlock, Calif. 93380

[22] Filed: Sept. 23, 1971

[21] Appl. No.: 182,971

[52] U.S. Cl. .................. 180/8 A, 180/4, 180/8 B, 305/1
[51] Int. Cl. .......................................... B62d 57/02
[58] Field of Search .................. 180/8 A, 8 B, 8 E, 180/9.22, 8 R, 4; 305/1, 2

[56] References Cited
UNITED STATES PATENTS

| | | | |
|---|---|---|---|
| 797,301 | 8/1905 | Magie | 180/8 E |
| 827,462 | 7/1906 | McGillis | 180/4 |
| 865,289 | 9/1907 | Bartlett | 180/4 |
| 1,404,101 | 1/1922 | Doyle | 180/4 |
| 2,873,870 | 2/1959 | Sowerby | 180/9.22 |

FOREIGN PATENTS OR APPLICATIONS 9,240  12/1915  Great Britain .................. 180/8 R

*Primary Examiner*—Richard J. Johnson
*Assistant Examiner*—Reinhard Eisenzopf
*Attorney*—Townsend and Townsend

[57] ABSTRACT

A vehicle suitable for use in moving heavy loads along horizontal and inclined paths wherein the vehicle includes a frame having a pair of spaced shafts rotatably mounted thereon. Each shaft has two pairs of disks rigidly secured thereto and being eccentrically mounted thereon, one pair of disks being rotatably mounted on a pair of inner track units and the other pair of disks being rotatably mounted on a pair of outer track units. The track units are generally parallel with each other and the eccentric coupling of the shafts to the inner track units is approximately 180° out of phase with that of the disks of the outer track units. Reversible drive means carried by the frame and coupled with the shafts rotating the same and thereby the disks relative to respective track units to cause one of the pairs of track units to advance in stepwise fashion as the other pair of track units remains stationary and vice versa. A pair of roller units can be releasably attached to the outer track units to permit the vehicle to be rolled over a flat surface with the track units elevated above the surface.

5 Claims, 6 Drawing Figures

INVENTORS
JAMES R. REYNOLDS
RICHARD L. MANSKE

BY Townsend and Townsend
ATTORNEYS

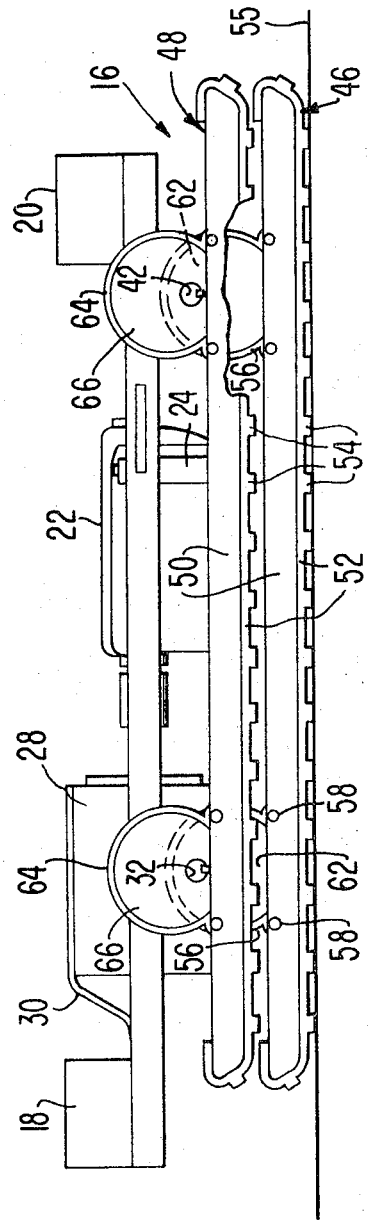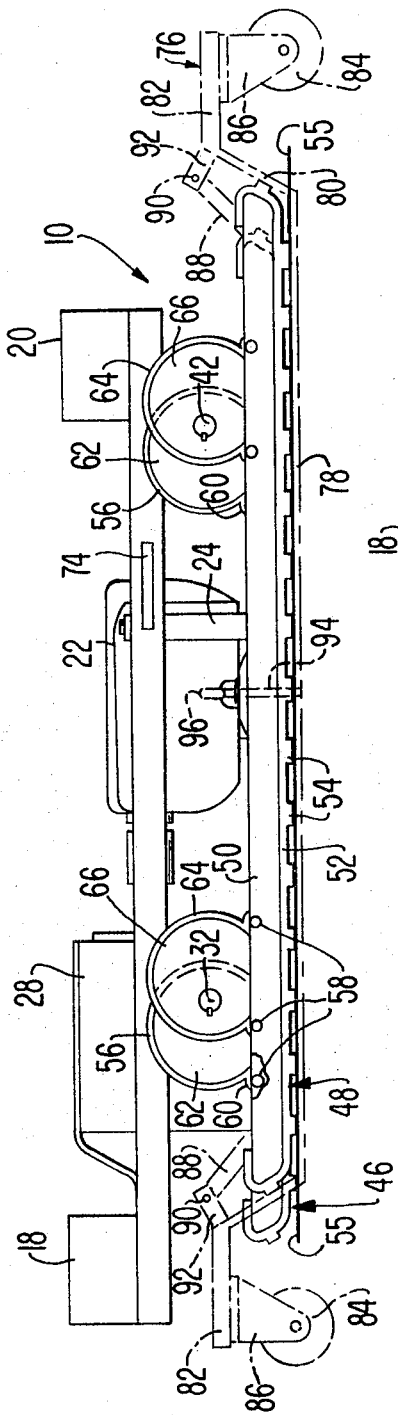
FIG. 3
FIG. 4
FIG. 5
INVENTORS
JAMES R. REYNOLDS
RICHARD L. MANSKE
BY Townsend and Townsend
ATTORNEYS

LOAD MOVING VEHICLE

This invention relates to improvements in structures for moving heavy loads, such as pianos and the like, and, more particularly, to a load moving vehicle capable of advancing in stepwise fashion over horizontal and inclined paths.

While the present invention is suitable for use either as a vehicle or load moving apparatus, it will hereinafter be described with respect to moving heavy loads, such as pianos or the like. Load moving devices of this type are generally known but, for the most part, they are complicated in construction, utilizing many gears, linkages and the like, thus requiring frequent maintenance to assure proper operation. Prior art structures have utilized two pairs of track units so that one pair of units step in a forward direction as the other pair of track units remain stationary, following which the second pair of track units advance in stepwise fashion as the first pair of track units remain stationary. Representative disclosures of this type of structure are the following U.S. Pat. Nos.: Magie, 797,301; Roy, 1,500,723; Urschel, 2,491,064; and Bell, 3,034,591.

The present invention provides improvements over conventional load carrying structures by providing an improved load carrying device which is simple and rugged in construction to minimize the number of parts and to assure a long operating life with minimum maintenance. To this end, the invention utilizes a frame on which a load to be carried can be secured. A pair of parallel rotatable shafts are secured to the frame to cause rotation of a number of disks eccentrically and rigidly mounted on the shafts at axially spaced locations thereon, the disks being provided for respective inner and outer track units which are adapted to alternately step over a surface as the shafts are rotated. The disks are rotatably mounted within circular bands rigidly coupled to respective track units so that, as the shafts rotate the resulting movements of the disks cause the first pair of track units to advance in stepwise fashion as the second pair of track units remains stationary, following which the second pair of track units advances in stepwise fashion as the first track units remain stationary. The stepwise movements of the track units thereby permit the frame to move in one direction so long as the shafts rotate. The apparatus is self-contained inasmuch as it has a power source, such as reversible electric motor on the frame and coupled to the shafts, the motor adapted to be coupled to a source of electrical power. Since the motor is reversible, the apparatus can be made to move forwardly or in reverse depending upon the desired direction of movement of the load.

Another aspect of the invention is the way in which a pair of roller units can be releasably coupled to the apparatus to render it movable over flat surfaces. Thus, to more quickly move a load over such a flat surface, the roller units can be mounted on the outer of the track units so that the apparatus can be shifted over the surface with the track units elevated above the same, thereby speeding up the rate of transfer of the load from one point to another.

The apparatus of the invention is suitable for movement either over horizontal paths or inclined paths. The track units are sufficiently rugged to assure that the load will properly be carried, yet the track units will have sufficient traction to avoid slippage even though the apparatus is moving a load up an inclined path. The apparatus is suitable for moving heavy loads under the control of only a single individual who operates a switch controlling the operation of the drive motor carried on the frame. No other assistance is needed even though the apparatus is carrying a heavy load up an inclined path, such as a flight of stairs. For use as a vehicle, the frame can be provided with the necessary structure to render the same capable of carrying personnel in much the same manner that it carries a heavy load.

The primary object of this invention is to provide an improved load carrying vehicle utilizing a pair of rotatable shafts coupled by improved eccentric means to first and second pairs of track units so that, as the shafts are rotated, the pairs of track units move alternately in stepwise fashion over a surface.

A further object of this invention is to provide a vehicle of the type described wherein each track unit has a pair of disks rotatably mounted thereon and rigidly and eccentrically mounted on the shafts so that, as the shafts are rotated, the disks are also rotated relative to respective track units to effect alternate up and down movement of the latter as a function of the rotation of the shafts to thereby cause the advancement of the respective track units in a desired direction.

A further object of this invention is to provide a vehicle of the aforesaid character wherein one of the pairs of track units can be provided with roller units releasably mounted thereon to permit the vehicle to be rolled over a flat surface even though it is carrying a heavy load.

Other objects of this invention will become apparent as the following specification progresses, reference being had to the accompanying drawings for an illustration of an embodiment of the apparatus.

In the drawings:

FIG. 3 is a side elevational view of the apparatus with its track units in first operative positions;

FIG. 4 is a view similar to FIG. 3 but showing the track units in second operative positions; and FIG. 5 is an end elevational view of the apparatus when the track units are in the operative positions of FIG. 3.

Figure 2A:
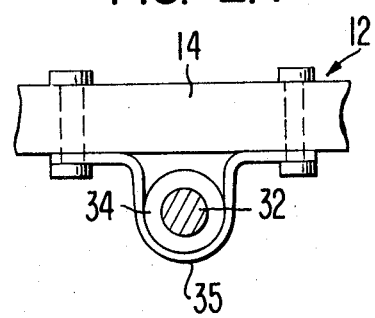
FIG. 2a is a fragmentary, cross-sectional view taken along line 2a–2a of FIG. 2.
Figure 2:
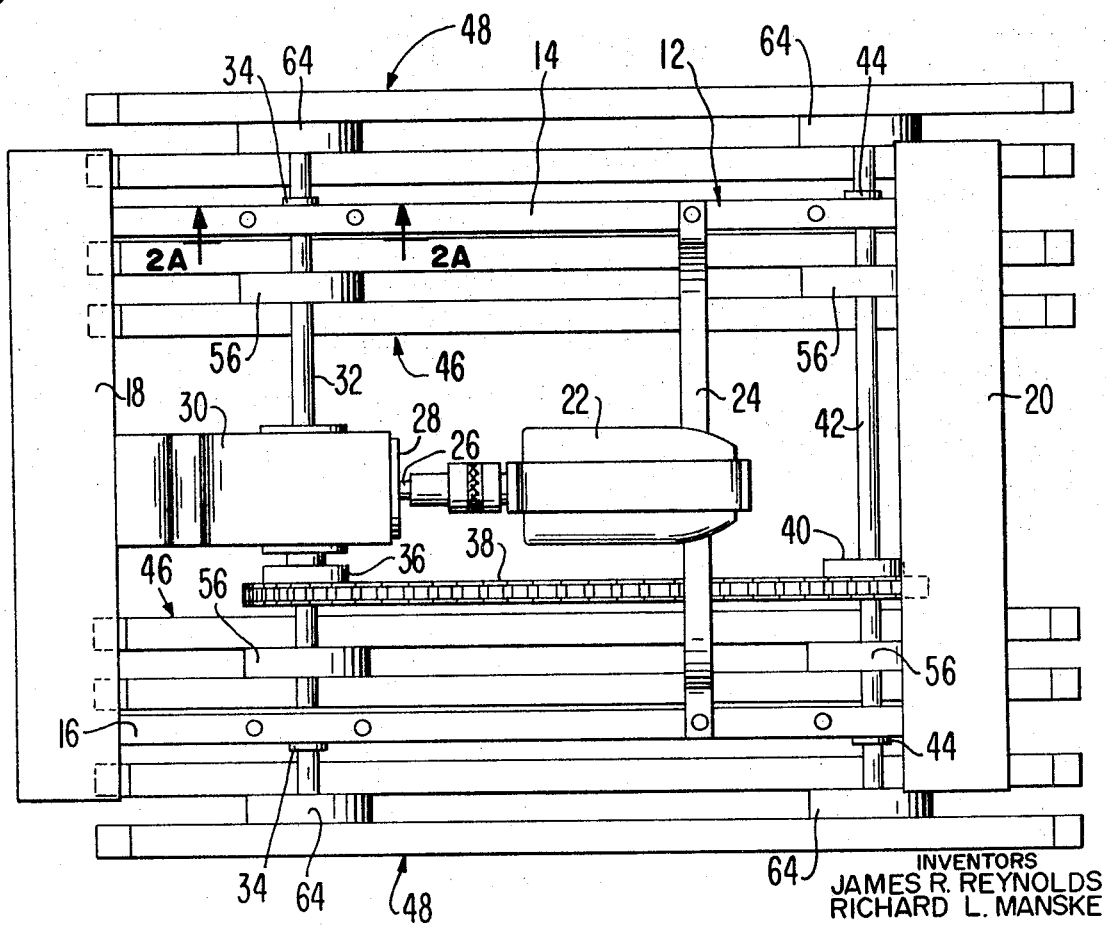
FIG. 2 is a top plan view of the apparatus.

The load moving apparatus of this invention is broadly denoted by the numeral 10 and includes a frame 12 comprised of a pair of generally parallel side rails 14 and 16 whose ends are connected together by a pair of generally parallel end members 18 and 20; thus, frame 12 is essentially rectangular in configuration. A reversible electric motor 22 is coupled to a rigid strap 24 spanning the distance between and connected to side rails 14 and 16 (FIG. 2). Strap 24 is shaped to allow motor 22 to be in the plane of frame 12 (FIGS. 3 and 4) so that the rotatable drive shaft 26 of the motor will be properly aligned with and can be coupled to the gears (not shown) of a gear box 28 secured by a second strap 30 to member 18 in any suitable manner. Motor 22 and gear box 28 are preferably located centrally between side rails 14 and 16. Gear box 28 has a rotatable, driven shaft extending outwardly from opposed sides thereof and coupled to its gears. Shaft 32 is caused to rotate when motor 22 is energized. The shaft can rotate in opposite directions inasmuch as motor 22 is reversible.

Each of the side rails 14 and 16 has a first bearing 34 secured by an arcuate band 35 (FIG. 2a) to the underside of the side rail and shaft 32 is mounted in and projects outwardly from bearing 34 for rotation with respect to frame 12.

A sprocket 36 (FIG. 2) is rigidly secured to shaft 32 at one side of gear box 28. An endless link chain 38 is coupled with sprocket 36 and extends laterally therefrom and about a second sprocket 40 rigidly secured to an idler shaft 42 which is of the same diameter as shaft 32 and is generally parallel therewith. Each of the side rails 14 and 16 has a second bearing 44 which is mounted to the underside of the side rail in the manner shown in FIG. 2a. Thus, when shaft 32 is rotated, chain 38 causes shaft 42 to rotate in the same direction as shaft 32.

Apparatus 10 is provided with a pair of inner track units 46 and a pair of outer track units 48 as shown in FIG. 5. Track units 46 are located inboard of respective side rails and track units 48 are located outward of the side rails. Each of the track units 46 and 48 includes a track member comprised of a rigid bar 50 having a lower, flat face, and a strip 52 of resilient material, such as hard rubber or the like, which engages and extends along the lower face of bar 50. Strip 52 has a number of spaced, flat-bottom cleats 54 to enhance the traction of the track as it moves over a surface 55 (FIG. 3). The ends of each strap 52 are secured in any suitable manner to the corresponding bar such as by extending upwardly and around the ends of the bar and being secured thereto by fasteners.

Each inner track unit 46 has a pair of spaced, circular bands 56, each band 56 being secured at two locations between the tracks thereof by a pair of fasteners 58 coupled through sleeves 60 rigid to the outer periphery of the corresponding band 56. Each band 56 projects upwardly from the corresponding track unit and has a disk 62 rotatably mounted and confined therewithin. The disks 62 of each track unit 46 are, for purposes of illustration only, denoted as left-hand and right-hand disks with reference to FIGS. 3 and 4. Shaft 32 is rigid to the left-hand disks 62 of inner track units 46 and shaft 42 is rigid to the right-hand disks 62. These shafts are eccentric by the same degree to respective disks 62, i.e., shafts 32 and 42 are radially spaced from and on the same sides of the central axes of respective disks 62 by the same distance.

Each outer track unit 48 has a pair of spaced bands 64 coupled between the tracks thereof in substantially the same manner as that described above with respect to bands 56. Each band 64 extends upwardly from the corresponding track unit 48 and has a disk 66 rotatably mounted and confined therewithin, disks 66 being of the same diameter as disks 62 and being denoted as left-hand and right-hand disks with reference to FIGS. 3 and 4. The left-hand disks 66 are rigidly secured to shaft 32 and the right-hand disks 66 are rigidly secured to shaft 42. These shafts are eccentric by the same degree to disks 66, i.e., shafts 32 and 42 are radially spaced from and on the same sides of the central axes of respective disks 66 by the same distance, this distance being the same distance as that by which shafts 32 and 42 are radially spaced from the central axes of disks 62. Also, the relative locations at which shafts 32 and 42 are connected to disks 62 are spaced 180° from the relative locations at which shafts 32 and 42 are connected to disks 66. Thus, when shafts 32 and 42 are at the 9 o'clock positions (with reference to FIGS. 3 and 4) on disks 62, the shafts are at the 3 o'clock positions on disks 66. Similarly, when shafts 32 and 42 are at the 6 o'clock positions on disks 66, the shafts are at the 12 o'clock positions on disks 62.

In operation, motor 22 is energized so that it rotates shaft 32 in one direction, such as in a counterclockwise direction when viewing FIGS. 3 and 4. When this occurs, shaft 42 is also rotated in the same direction under the influence of chain 38.

Assuming that both pairs of inner and outer track units are in the positions shown in FIG. 4, shafts 32 and 42 are in 3 o'clock positions with respect to disks 62 of inner track units 46 and shafts 32 and 42 are at 9 o'clock positions with respect to disks 66 of outer track units 48. In such positions, inner and outer track units 46 and 48 are both in engagement with surface 55.

Assuming both shafts 32 and 42 rotate through a half revolution, the shafts move from the 3 o'clock positions of respective disks 62, through the 12 o'clock positions, then to the 9 o'clock positions of disks 62. During this time, both inner track units 46 remain stationary on surface 55 but both outer track units 48 move to the left in a stepwise fashion. The reason for this is that shafts 32 and 42 move from the 9 o'clock positions of respective disks 66, through the 6 o'clock positions and then to the 3 o'clock positions of these disks. When this occurs, both track units 48 are elevated from surface 55 and are advanced to the left when viewing FIG. 4 since the disks 66 rotate within respective bands 64 and, in moving from the 9 o'clock to the 3 o'clock positions, advance bands 64 relative to inner track units 46; thus, respective track units 48 move through a step or incremental distance since, as the shafts move from the 9 o'clock to the 3 o'clock positions of disks 66, the bands 64 are elevated and, because disks 66 are secured to the shafts, the shafts are also elevated. Since the shafts are secured to frame 12, it is also raised and then lowered during the step taken by each outer track unit. FIG. 3 illustrates the 6 o'clock positions of shafts 32 and 42 with respect to disks 66 and the 12 o'clock positions of the shafts with respect to disks 62.

When shafts 32 and 42 reach the 9 o'clock positions of disks 62, the shafts will be in the 3 o'clock positions of disks 66. During the second half revolution of the shafts in counterclockwise directions, the shafts will move from the 3 o'clock positions of disks 66 to the 9 o'clock positions thereof; thus, outer track units 48 will remain in engagement with surface 55 during this second half revolution. However, during this second half revolution, the shafts will move from the 9 o'clock positions of disks 62 to the 3 o'clock positions thereof, whereupon bands 56 will be elevated to, in turn, advance inner track units 46 in stepwise fashion through the same incremental distance previously stepped off by the outer track units 48. Frame 12 will raise and lower as before during this second step and, at the end of the second step, track units 46 again engage surface 55 at which time the track units will be in the starting conditions shown in FIG. 4. In the foregoing manner, apparatus 10 will be caused to move in a series of steps to the left and each time a step is taken by a pair of track units, frame 12 is raised and lowered through a small distance. The maximum height through which frame 12 is elevated occurs when shafts 32 and 42 are at 6 o'clock positions with respect to the disks of one pair of track units and at 12 o'clock positions with respect to the disks of the other pair of track units.

Reversal of motor 22 will cause apparatus 10 to move to the right in essentially the same way but in reverse to that described above with respect to counterclockwise rotation of the shafts. Thus, the track units will take a series of steps, the inner track units being in engagement with surface 55 as the outer track units 48 take the steps and vice versa.

Figure 1:
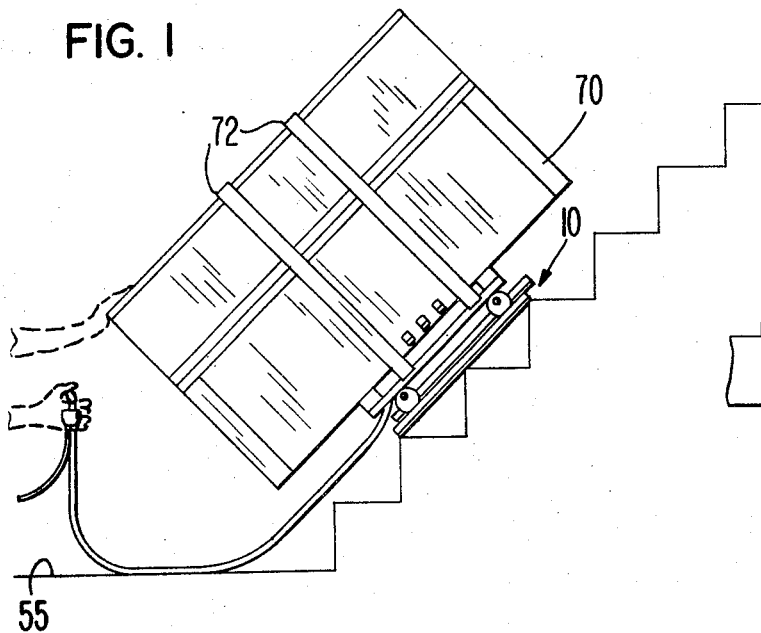
FIG. 1 is a side elevational view of the load moving apparatus of this invention, illustrating the use of the apparatus in carrying a load up a flight of stairs.

Apparatus 10 is suitable for moving heavy loads over horizontal or inclined paths, such paths being shown in FIG. 1 wherein a load 70 secured by straps 72 to apparatus 10 is moved up a flight of stairs extending between a lower horizontal surface 55 to an upper horizontal surface 55a. The operator controlling apparatus 10 is provided with an electrical switch 73 coupled by cable 75 to motor 22, the latter being coupled in some suitable manner to a source of electrical power. Operation of switch 73 effects operation of the motor. Side rails 14 and 16 are provided with slots 74 to receive fittings on the ends of straps 72 to provide a quick release connection between the straps and the rails.

When it is desired to move apparatus 10 over a horizontal surface, a pair of roller units 76 are provided for outer track units 48 respectively. Only one of the roller units is shown in FIG. 4 in dashed lines.

Each roller unit 76 includes a main bar 78 adapted to underlie the cleats 54 of the resilient strips 52 of both tracks of a corresponding outer track unit 48. Each bar 78 has a pair of inclined segments 80 at the ends thereof and outwardly extending bar segments 82 are rigid to and extend laterally from the ends of respective segments 80. A caster 84 is secured by a bracket 86 to each segment 82, respectively, whereby the roller can engage the horizontal surface at a location below the plane of bar 78. A pair of short bars 88 are pivoted by pins 90 to the outer ends of an extension 92 secured to the upper end of the corresponding segment 80. Bars 88 extend into the space between the tracks of the corresponding track unit 48 to prevent lateral movement of roller unit 76. Also a screw 94 having a head 96 is movable into the space between the tracks of the outer track unit 48 and can be threaded into the corresponding bar 78. Head 96 forces a washer 97 into engagement with the upper surfaces of the adjacent tracks to releasably lock the roller unit to the outer track unit.

To utilize the roller units, apparatus 10 is tilted slightly to allow a bar 78 of one of the roller units to underlie the corresponding strips 52. Then bars 88 are pivoted so that they extend into the space between the tracks of the corresponding outer track unit 48. Then screw 94 is threaded into strip 78. The other roller unit 76 is coupled to the opposite outer track unit 48 in essentially the same way. To remove the roller units 76, screws 94 are removed and bars 88 are manually pivoted out of the spaces between the respective track units 48 and apparatus 10 is lifted off the roller units.

We claim:

1. A vehicle comprising: a frame having a pair of opposed sides; a pair of generally parallel shafts rotatably mounted on the frame and extending transversely of the sides; a pair of side-by-side track units for each side of the frame, respectively, each pair of track units being adjacent to and extending longitudinally of the corresponding side, each track unit including a pair of spaced, parallel side-by-side tracks, each shaft having a pair of axially spaced rotors on each end thereof, respectively, a first of the rotors of each pair being vertically aligned with and above the space between the tracks of one of the adjacent track units and the second rotor of each pair being vertically aligned with and above the space between the tracks of the other adjacent track unit, each rotor being rigidly and eccentrically mounted on the corresponding shaft with the shaft being coupled with the first rotor of each pair at a location on the first rotor circumferentially spaced from the location on the corresponding second rotor at which the shaft is coupled, whereby the adjacent first and second rotors are out of phase with respect to each other; first means coupled to the tracks of each said one track unit for rotatably mounting the corresponding first rotor thereon; second means coupled to the tracks of each said other track unit for rotatably mounting the corresponding second rotor thereon; and means carried by the frame for rotating the shafts in the same direction.

2. A vehicle as set forth in claim 1 wherein said rotating means comprises a reversible motor.

3. A vehicle as set forth in claim 1 wherein each rotor includes a disk, each of said first means and said second means including an arcuate band coupled at a pair of spaced locations to and extending upwardly from each track of the corresponding track unit, each disk being rotatably mounted within the corresponding band.

4. A vehicle as set forth in claim 1 wherein is provided a pair of roller units, each roller unit being removably coupled to a first of the track units of each pair.

5. A vehicle comprising: a frame having a pair of opposed sides; a pair of generally parallel shafts rotatably mounted on the frame and extending transversely of the sides; a pair of side-by-side track units for each side of the frame, respectively, each pair of track units being adjacent to and extending longitudinally of the corresponding side, each shaft having a pair of axially spaced rotors on each end thereof, respectively, a first of the rotors of each pair being vertically aligned with one of the adjacent track units and the second rotor of each pair being vertically aligned with the other adjacent track unit, each rotor being rigidly and eccentrically mounted on the corresponding shaft with the shaft being coupled with the first rotor of each pair at a location on the first rotor circumferentially spaced from the location on the corresponding second rotor at which the shaft is coupled, whereby the adjacent first and second rotors are out of phase with respect to each other; first means for rotatably mounting each first rotor on the corresponding one track unit; second means for rotatably mounting each second rotor on the corresponding other track unit; means carried by the frame for rotating the shafts in the same direction; and a pair of roller units adapted to be removably coupled to a first of the track units of each pair, each roller unit comprising a bar movable into a position underlying the corresponding first track unit, and a caster at each end of the bar, respectively, the casters adapted to support the frame and the track units when the latter are elevated from a supporting surface.

* * * * *